United States Patent Office 2,977,394
Patented Mar. 28, 1961

2,977,394

BIS (TRIFLUOROMETHYL) SUBSTITUTED BICYCLO-OCTATRIENES

Carl George Krespan and George Neil Sausen, Wilmington, Del., assignors to E. I. du Pont de Nemours and Company, Wilmington, Del., a corporation of Delaware No Drawing. Filed Apr. 15, 1959, Ser. No. 806,415

19 Claims. (Cl. 260—648)

This invention relates to a new class of organic fluorine-containing compounds and to their preparation. In particular, it relates to a new class of polyfluorinated unsaturated compounds.

Organic compounds which contain fluorine have become technically important in recent years because they possess unusual physical and chemical properties. The compounds which have been studied have been principally non-cyclic types, i.e., the compounds have open-chain structures which are saturated or which contain olefinic bonds. Fluorinated saturated open-chain compounds show excellent thermal stability and fluorinated open-chain olefins are polymerizable to technically valuable products. Little or no information is available on the properties or methods of preparation of fluorine-containing polycyclic compounds, particularly fluorinated polycyclic compounds which contain nuclear aliphatic unsaturation. It is to this class of compounds that this application is directed.

The present invention provides a new class of unsaturated polycyclic organic compounds which have as a characteristic feature a bis(fluoroalkyl)substituted bicyclo[2.2.2]octatriene nucleus. The compounds of the invention have at least two fused rings of six carbons each, which rings have a common side of 4 carbons, in which side the two end carbons of the four common carbons are bonded to hydrogen and the two inner common carbons are joined by a double bond and are, further, each singly bonded to a monovalent radical consisting of carbon and fluorine and at most one hydrogen or one chlorine, which hydrogen or chlorine, if present, is bonded to the omega-carbon of the monovalent radical, i.e., the two inner common carbons are singly bonded to perfluoroalkyl, omega-hydroperfluoroalkyl or omega-chloroperfluoroalkyl groups; in which the two non-common carbons in one of said six carbon rings are joined by a double bond, each of said non-common carbons being further bonded to a member of the group consisting of (1) hydrogen, (2) a monovalent organic group bonded to the nuclear carbon through carbon or oxygen; said group being free of Zerewitinoff active hydrogen and containing only carbon and at least one of the elements of the group hydrogen, oxygen and halogen, or (3) a divalent 1,3-dienylene radical which forms with said doubly-bonded carbons an aromatic ring; and in which the two non-common carbons of the other of said six carbon rings are joined by a double bond, each of said non-common carbons being further singly bonded to hydogen or an aliphatically saturated hydrocarbon group or a divalent 1,3-dienylene radical which forms with said doubly-bonded carbons an aromatic ring.

The compounds of the invention are represented by the following structural formula:

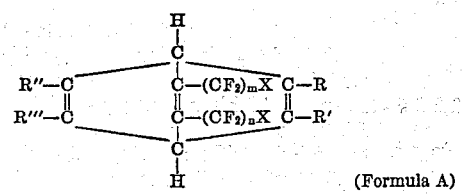

(Formula A)

R and R' are (1) hydrogen, or (2) monovalent organic substituents bonded to the nuclear carbons through carbon or oxygen, which substituents are free of Zerewitinoff active hydrogen and contain only carbon and at least one of the elements of the group of hydrogen, oxygen and halogen, or (3) taken together, a divalent 1,3-dienylene group which forms an aromatic ring with the nuclear doubly-bonded carbons; R'' and R''' are (1) hydrogen, or (2) hydrocarbon groups, or (3) taken together, a divalent 1,3-dienylene group which forms an aromatic ring with the nuclear doubly-bonded carbons. X represents hydrogen, chlorine or fluorine and may be alike or different in each fluoroalkyl group. The subscripts $m$ and $n$ are positive integers which may be alike or different. Preferably the sum of the values of $m$ and $n$ is at most 22.

In a preferred group of compounds of the invention R and R' are hydrogen, alkyl, cycloalkyl, haloalkyl, halocycloalkyl, aryl, haloaryl or alkoxy, groups of up to 16 carbons, or taken together, a divalent 1,3-alkadienylene group or a halo-1,3-alkadienylene group which forms an aromatic ring with the doubly-bonded nuclear carbons; R'' and R''' are hydrogen or hydrocarbon groups of up to 16 carbons or, taken together, a divalent 1,3-alkadienylene group or a halo-1,3-alkadienylene group which forms an aromatic ring with the doubly-bonded nuclear carbons.

In an especially preferred group of compounds, R and R' are hydrogen or alkyl, fluoroalkyl or alkoxy groups of up to 8 carbons, or taken together, a divalent 1,3-alkadienylene group or halo-1,3-alkadienylene group of at most 8 carbons which forms an aromatic ring with the doubly-bonded nuclear carbons; R'' and R''' are hydrogen or alkyl groups of up to 8 carbons, or taken together, a divalent 1,3-alkadienylene or halo-1,3-alkadienylene group of at most 8 carbons which forms an aromatic ring with the doubly-bonded nuclear carbons, with the proviso that at most one of R, R', R'' and R''' is hydrogen; $m$ and $n$ are positive integers of at most 8, i.e., $m$ and $n$ have values from 1–8, inclusive.

Substituents which are illustrative of R and R' in the above formula are methyl, isobutyl, tertiary butyl, cyclohexyl, phenyl, naphthyl, methoxy, octyloxy, 4-methylcyclohexyloxy, phenoxy, p-octylphenoxy, β-naphthyloxy, fluoromethyl, β-chloroethyl, o-fluorophenyl and p-chlorophenyl.

Substituents which are illustrative of R'' and R''' are methyl, 2-ethylhexyl, benzyl, cyclohexyl, cyclopentyl, 4-octylcyclohexyl, crotyl, phenyl and p-hexylphenyl.

It is stated in the description of the substituents that R can be joined to R' and that R'' can be joined to R''' to form in each case a divalent 1,3-dienylene radical. This radical is represented by the structure

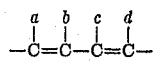

where $a$, $b$, $c$, and $d$ are hydrogen, halogen, saturated hydrocarbon groups or saturated halohydrocarbon groups in which the number of carbon atoms in each group does not exceed 8. Groups which are illustrative of $a$, $b$, $c$, and $d$ are methyl, butyl, amyl, octyl, chloroethyl, fluoroethyl, difluoromethyl, trifluoromethyl, and chlorine.

The following examples illustrate specifically typical compounds of the invention. In naming the compounds the positions of the substituents are given the lowest permissible numbers with precedence generally being given to any substituents originally present on the aromatic reactant.

2,3 - bis(trifluoromethyl)bicyclo[2.2.2]octa - 2,5,7 - triene
2,3 - dimethyl - 5,6 - bis(trifluoromethyl)bicyclo[2.2.2]octa-2,5,7-triene
2,3,5,6 - tetrabutyl-7,8-bis(perfluoropropyl)bicyclo[2.2.2]-octa-2,5,7-triene
2,3,5,6-tetramethyl-7-trifluoromethyl - 8 - perfluoropropyl-bicyclo[2.2.2]octa-2,5,7-triene
2,3,5,6 - tetraethyl - 7 - perfluoroethyl-8-perfluorobutyl-bicyclo[2.2.2]octa-2,5,7-triene
2-phenyl-5,6-bis(trifluoromethyl)bicyclo[2.2.2]octa-2,5,7-triene
2-ethoxy-5,6-bis(trifluoromethyl)bicyclo[2.2.2]octa-2,5,7-triene
2 - trifluoromethyl-5,6-bis(trifluoromethyl)bicyclo[2.2.2]-octa-2,5,7-triene
2-(omega-chlorohexyl) - 5,6 - bis(trifluoromethyl)bicyclo-[2.2.2]octa-2,5,7-triene
2,3 - bis(chlorodifluoromethyl) - 1,4 - dihydro-1,4-etheno-naphthalene
2,3-bis($\omega$-hydroperfluorooctyl)-1,4-dihydro - 1,4 - etheno-naphthalene
2-dodecyl-9,10 - bis(trifluoromethyl)-1,4-dihydro-1,4-eth-enonaphthalene
11,12 - bis($\omega$-chloroperfluorooctyl) - 9,10 - dihydro - 9,10-ethenoanthracene
11,12-bis(perfluoroethyl) - 9,10 - dihydro - 9,10-ethenoanthracene
11,12-bis(chlorodifluoromethyl)-9,10-dihydro - 9,10 - ethenoanthracene
11,12-bis($\omega$-hydroperfluorohexyl)-9,10 - dihydro-9,10-ethenoanthracene
11,12-bis(difluoromethyl)-9,10-dihydro - 9,10 - ethenoanthracene The new compounds of the invention are liquids or solids which are generally non-corrosive and which have a broad range of thermal stabilities. The simplest compounds, i.e., the compounds in which R, R′, R″ and R‴ of Formula A are hydrogen or at most three short-chain alkyl monovalent substituents, generally have low thermal stabilities. These compounds are readily converted to stable symmetrically substituted polycyclic compounds which are within the scope of the invention. To illustrate, the compound 2,3-bis-(trifluoromethyl)bicyclo [2.2.2]octa-2,5,7-triene, is readily converted by procedures which are illustrated later, to 2,3,6,7,9,10-hexa(trifluoromethyl)-1,4-dihydro-1,4-ethenonaphthalene, a compound which is within the scope of the invention and which has the following structural formula:

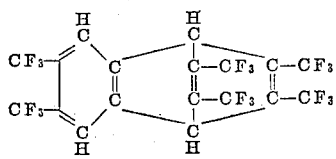

The compounds of the invention in which R, R′, R″ and R‴ of Formula A are hydrogen or at most three short-chain alkyl groups are particularly useful for preparing products with unusual chemical structures which are not readily obtained by other means and which possess excellent thermal stability. These derived compounds are stable liquids which are useful as heat transfer and pressure transmitting fluids.

Compounds of the invention in which all of the R, R′, R″, and R‴ are substituents, i.e., in which none of R, R′, R″, and R‴ is hydrogen, generally show good resistance against degradation by heat and can be distilled under reduced pressure.

The highly substituted compounds can be stored in conventional containers (for example, containers of glass, polyethylene, stainless steel or galvanized metal) for long periods of time at prevailing atmospheric temperatures without significant changes in properties. The compounds of this group are thermally stable and possess good resistance to oxidative degradation.

The process for preparing the compounds of the invention, in its broadest form, consists in reacting ($a$) a compound containing an acetylenic linkage, i.e., two carbons joined by a triple bond, in which the carbons joined by the triple bond are each bonded to a saturated open-chain group composed of carbon, fluorine and at most one hydrogen or chlorine, which hydrogen or chlorine, if present, is bonded to the omega-carbon of the group, and ($b$) an organic compound containing at least one aromatic ring in which the nuclear carbons in the 1- and 4-positions, i.e., carbons which are in positions para to each other, are each bonded to hydrogen; the nuclear carbons in the 2- and 3-positions are each bonded to a member of the group consisting of (1) hydrogen, (2) a monovalent organic group bonded to the nuclear carbon through carbon or oxygen sulfur, said group being free of Zerewitinoff active hydrogen and containing only carbon and at least one of the elements in the group hydrogen, oxygen and halogen, or (3) a divalent 1,3-dienylene radical which forms with the nuclear carbons in the 2- and 3-positions an aromatic ring; the nuclear carbons in 5- and 6-positions are each bonded to hydrogen or an alphatically saturated hydrocarbon group or a divalent 1,3-dienylene radical which forms with the nuclear carbons in the 5- and 6-positions an aromatic ring.

The process may also be described as the reaction of a compound of the formula $X(CF_2)_m-C\equiv C-(CF_2)_nX$ (Formula C) where X is hydrogen, chlorine or fluorine and $m$ and $n$ are positive integers, with a compound of the formula

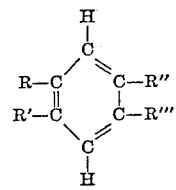

(Formula B)

in which R, R′, R″, and R‴ have the meanings described in an earlier paragraph for the new compounds of the invention (Formula A). Preferably the sum of the values for $m$ and $n$ in the acetylenic reactant is at most 22.

An especially prefered group of aromatic reactants are compounds of the above structural formula (Formula B) in which R and R′ are hydrogen or alkyl, fluoroalkyl or alkoxy groups of up to 8 carbons, or taken together, a divalent 1,3-alkadienylene or halo-1,3-alkadienylene group of at most 8 carbons which forms an aromatic ring with the doubly-bonded nuclear carbons; R″ and R‴ are hydrogen or alkyl groups of up to 8 carbons, or taken together, a divalent 1,3-alkadienylene or halo-1,3-alkadienylene group of at most 8 carbons which forms an aromatic ring with the doubly-bonded nuclear carbons, with the proviso that at most one of R, R′, R″, and R‴ is hydrogen. An especially preferred group of acetylenic reactants are polyfluoroacetylnes of the formula $X(CF_2)_m-C\equiv C-(CF_2)_nX$, where $m$ and $n$ are positive integers whose sum is at most 16. X, as stated earlier, is hydrogen, chlorine or fluorine.

In the reaction the carbons joined by the triple bond in the polyfluoroacetylene form bonds with the hydrogen-bearing carbons in the 1,4-position in the aromatic ring, thus forming a two-carbon bridge in which the two carbons are joined by a double bond. Thus, in the operation of the process at least one mole of acetylenic compound reacts with one mole of the aromatic compound of the structural formula described in the preceding paragraph as illustrated by the following equation:

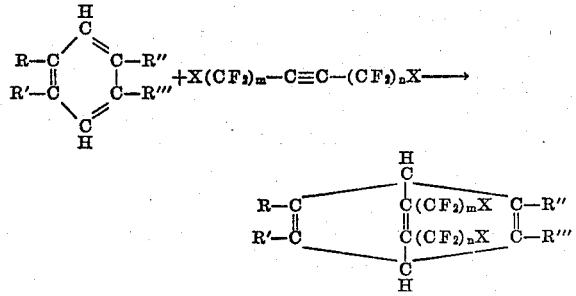

However, as discussed in an earlier paragraph, rearrangement of the initial addition product may occur to form an aromatic compound whose structure conforms with the definition given for the aromatic reactants employed in the process. The rearranged product can then add another molecule of the polyfluoroacetylene to yield a polyfluoroalkyl-substituted polycyclic compound of the invention. This mode of operation of the process is illustrated more fully in Example VI, which is directed to the reaction with benzene.

The aromatic compounds which are employed as one group of reactants are generally well known products which are available commercially.

The following examples illustrate the broad range of aromatic compounds which are operable as reactants in the process of the invention: Benzene, toluene, o-, m- and p-xylenes, octylbenzene, 1,2,4-trimethylbenzene, 1,2,4,5-tetraethylbenzene, naphthalene, anthracene, phenanthrene, diphenyl, m-terphenyl, diphenylmethane, benzyl chloride, benzotrifluoride, phenetole and butoxybenzene.

The polyfluoroacetylenes which are employed as the second group of reactants may be obtained by several methods. The bis(perfluoroalkyl)acetylenes may be prepared by the process described in U.S. Patent 2,546,997. The bis(ω-hydroperfluoroalkyl)acetylenes can be prepared by reacting an ω-hydroperfluorocarboxylic acid chloride with 1,1-dichloro-2,2-difluoroethylene at 140–150° C. in the presence of nickel carbonyl catalyst whereby carbon monoxide is eliminated and addition takes place to give a dichloro-ω,ω'-dihydroperfluoroalkene of the formula

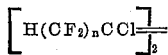

On removal of chlorine from the dichloroolefin, e.g., by treatment with magnesium in tertahydrofuran or with zinc in acetic anhydride, there is obtained the bis(ω-hydroperfluoroalkyl)acetylene, $$H(CF_2)_nCF_2—C≡C—CF_2—(CF_2)_nH$$

The first member of this series of compounds is described in U.S. Patent 2,558,875. Unsymmetrically substituted ω-hydroperfluoroalkylacetylenes, i.e., compounds of the structure $H(CF_2)_mC≡C(CF_2)_nH$ are obtained by employing mixtures of the ω-hydroperfluoroacyl halides as the starting material.

The bis(ω-chloroperfluoroalkyl)acetylenes are prepared from the α,α,α,ω-tetrachloroperfluoroalkanes of the type $Cl(CF_2)_nCCl_3$, which are themselves made by telomerization of tetrafluoroethylene with carbon tetrachloride. Upon treatment with copper or with zinc activated with copper in ether, the α,α,α,ω-tetrachloroperfluoroalkane couples with loss of chlorine to yield the corresponding tetrachloroperfluoroolefin,

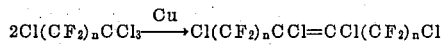

The tetrachloroperfluoroolefin is then dehalogenated by treatment with magnesium in tetrahydrofuran or with zinc in acetic anhydride to give the bis(ω-chloroperfluoroalkyl)acetylene, $Cl(CF_2)_nC≡C(CF_2)_nCl$. The first member of this series of compounds, bis(chlorodifluoromethyl)acetylene, is described in U.S. Patent 2,522,566. Unsymmetrically substituted acetylenic compounds may be obtained by employing mixtures of α,α,α,ω-tetrachloroperfluoroalkanes in the coupling reaction.

The reactants need not be especially purified prior to use. Conventional methods of purification can be used, if desired.

The 1,12-dihydroeicosafluoro-6-dodecyne used as the starting material in Examples II and IV–B was prepared as follows:

A. A mixture of 75 g. of ω-hydroperfluorovaleryl chloride, $H(CF_2)_4COCl$, 25 g. of nickel carbonyl and 26 g. of 1,1-difluoro-2,2-dichloroethylene was heated at 150° C. for 8 hours in a bomb. The reaction product was shaken with water and the lower layer was collected. The combined product from five preparations was distilled to give 70 g. of 1,12-dihydro-6,7-dichloroperfluoro-6-dodecene, $H(CF_2)_5CCl=CCl(CF_2)_5H$, B.P. 104–109° C. at 16 mm.

*Analysis.*—Calc'd for $C_{12}H_2Cl_2F_{20}$: Cl, 11.88; F, 63.65. Found: Cl, 12.86; F, 62.28.

The nuclear magnetic resonance spectrum supported the assigned structure.

B. To 3.68 g. of magnesium turnings in 20 ml. of tetrahydrofuran was added 15 ml. of a solution of 25.0 g. of $H(CF_2)_5CCl=CCl(CF_2)_5H$ in 100 ml. of tetrahydrofuran. Reaction soon set in at room temperature, and the mixture was cooled in an ice bath. The remainder of the halide solution was added at a rate of one drop per second, and the dark solution was then stirred for 2 hours at 0° C. A 75 ml. portion of the solvent was removed under reduced pressure, the excess magnesium was filtered off, and the filtrate was poured into 750 ml. of water. After breaking the emulsion with dilute sulfuric acid, the organic material was extracted with ether. Fractionation of the dried ether extracts gave 4.55 g. of 1,12-dihydroeicosafluoro-6-dodecyne as a colorless liquid, B.P. 71–76° C. at 18 mm., and 5.5 g. of a mixture of this product with the starting material.

*Analysis.*—Calc'd for $C_{12}H_2F_{20}$: C, 27.39; H, 0.38; F, 72.22. Found: C, 27.71; H, 0.90; F, 71.90.

The nuclear magnetic resonance spectrum supported the assigned structure.

The 1,6-dichloroperfluoro-3-hexyne used as the starting material in Example IV–C was prepared as follows:

A. A mixture of 187 g. of 1,3,3,3-tetrachloro-1,1,2,2-tetrafluoropropane (which can be prepared as described by Coffman et al. in J. Am. Chem. Soc. 71, 979 (1949)) and 114 g. of copper powder was heated in an agitated bomb at 180° C. for 15 hours. The reaction product was extracted continuously with methylene chloride for 10 hours. Distillation of the extract gave 88 g. of 1,3,4,6-tetrachloro-1,1,2,2,5,5,6,6-octafluoro-3-hexene,

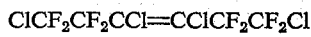

B.P. 95–98° C. at 100 mm.

*Analysis.*—Calc'd for $C_6Cl_4F_8$: Cl, 31.77; F, 41.54. Found: Cl, 31.49; F, 41.55.

B. A flask fitted with a stirrer, a dropping funnel and a short distilling column was charged with 20 g. of zinc dust and 60 ml. of acetic anhydride. The mixture was heated until the head temperature reached 135° C., and then a solution of 44.2 g. of

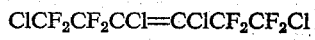

in 20 ml. of acetic anhydride was added in small portions over a period of four hours. During this time the reaction product was removed continuously at a head temperature of 83–93° C. There was obtained 36.5 g. of colorless distillate which was washed with water, 5% sodium bicarbonate and again with water to remove co-distilled acetic anhydride. After drying over sodium sulfate, the product was distilled, giving 25 g. of 1,6-dichloroperfluoro-3-hexyne, B.P. 82–84° C., $n_D^{24}$, 1.3210.

Analysis.—Calc'd for $C_6Cl_2F_8$: C, 24.43; Cl, 24.04; F, 51.53. Found: C, 25.24; Cl, 24.44; F, 51.61.

The infrared and nuclear magnetic resonance spectra supported the assigned structure.

The following examples are illustrative of the acetylenic compounds which are operable as reactants in the proces: hexafluoro-2-butyne, octafluoro-2-pentyne, perfluoro-3-hexyne, perfluoro-2-hexyne, perfluoro-5-decyne, perfluoro-7-tetradecyne, perfluoro-2-tetracosyne, 1,4-dihydrotetrafluoro-2-butyne, 1,6-dihydroperfluoro-3-hexyne, 1,18-dihydroperfluoro-8-octadecyne, 1,4-dichlorotetrafluoro-2-butyne, 1,10-dichloroperfluoro-5-decyne, 1,14-dichloroperfluoro-7-tetradecyne, and the like. Preferably the number of carbon atoms in the acetylenic compound does not exceed 24, i.e., the sum of $m$ and $n$ in Formula C for the acetylenic compound is not more than 22.

The reaction can, if desired, be conducted in a suitable solvent. Fluorocarbons, for example, perfluorocyclohexane, are useful for this purpose. The use of a solvent is not critical and it is not essential for operability that a solvent be employed.

In the operation of the process of the invention employing a monocyclic aromatic reactant in which the groups R, R', R", and R''' are hydrogen or at most three short-chain monovalent groups, it is advantageous to employ the crude intermediate products, i.e., the polyfluoroalkyl-substituted octa-2,5,7-trienes, as obtained without separation or purification and to continue the reaction through the formation of these intermediates to the stage where products of excellent thermal stability are obtained. This method of preparing and utilizing the compounds of the invention is particularly applicable when, for example, benzene, toluene, the xylenes or ethylbenzene are employed as the aromatic reactants.

The reaction between the aromatic compound and the polyfluoroacetylene is conducted in either a batch or continuous flow process. A batch process is best performed under pressure in a closed vessel which is lined with an inert material such as glass, platinum or stainless steel. The reaction vessel is charged with the aromatic compound, chilled, purged with an inert gas, for example, nitrogen, or evacuated to a few millimeters pressure to remove as much oxygen as possible. It is then charged with the polyfluoroacetylene. The reaction vessel is closed and heated to a temperature sufficiently high to permit the reaction to reach completion in a reasonable time but below the decomposition temperature of the initial reactants. The temperature will generally be between about 100° and 500° C.; the preferred temperatures are between about 150° and 350° C. The time for completion of the reaction generally lies between 4 and 48 hours; preferably the reaction is allowed to proceed for 8–24 hours.

During the reaction period the contents of the reaction vessel are preferably mixed, for example, by mechanical stirring or shaking. Heating can be accomplished by conventional and well-known methods. The reactants can be heated slowly by a stepwise procedure wherein the reactants are maintained for short periods of time at progressivley higher temperatures. This procedure permits smooth operation of the process and avoids sudden increases in pressure in the reaction vessel. However, this procedure is not essential for operability and the reactants can, if desired, be heated in one step to the desired reaction temperature.

The pressure employed in a batch operation is generally autogenous. It will usually lie between about 5 and 1000 atmospheres but pressures outside this range are operable. Reaction under pressure is not essential for operability.

The molar ratios in which the reactants are used is not critical for operability of the process. The molar ratio of the acetylenic reactant to aromatic reactant can range from 1:20 to 20:1, preferably the ratio lies between 1:5 and 5:1. From an economic point of view, it is frequently desirable to use the lower cost reactant, which is usually the aromatic compound in excess to assure maximum use of the higher cost reactant, i.e., the polyfluoroacetylene. It is also possible to have present in one compound two or more aromatic rings each of which will react with the polyfluoroacetylene. Under such conditions, at least one mole of the polyfluoroacetylene is preferably used for each aromatic nucleus which enters the reaction. To illustrate, bis(2,4,5-trimethylphenyl)propane reacts with 2 moles of hexafluoro-2-butyne as follows:

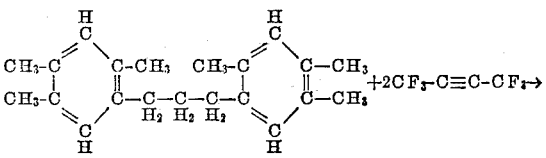

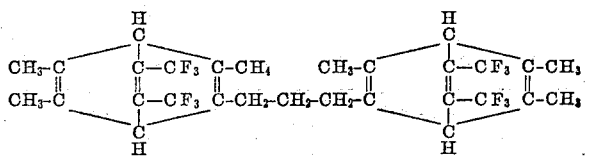

The process can also be conducted by a continuous flow method, as stated earlier, wherein the reactants are passed into a tube which is heated to a temperature sufficient to effect reaction. The crude reaction mixture is withdrawn continuously and the reaction product is separated by conventional methods such as crystallization or distillation. Unreacted materials can be recovered and returned to the reaction zone. Generally higher temperatures are needed in a continuous flow process than in a batch process since the former process is normally conducted at atmospheric pressure or pressures close to atmospheric. In a continuous flow process contact time between the reactants is short.

The products of the reaction, i.e., the di(polyfluoroalkyl)octa-2,5,7-trienes are purified by well-known procedures, for example, crystallization from a suitable solvent, distillation through an efficient fractionating column, or chromatography.

The following examples in which quantities are expressed as parts my weight illustrate the process of the invention. In the structural formulas of the compounds, nuclear carbons and hydrogens bonded to these carbons are not shown but it is understood that they are present.

*Example 1*

A. A pressure vessel (capacity 80 parts of water), lined with a corrosion-resistant steel, is charged with 20.1 parts of durene (1,2,4,5-tetramethylbenzene). The vessel is closed, cooled in solid carbon dioxide, evacuated to less than 10 mm. pressure and charged with 24 parts of hexafluoro-2-butyne. The reactants are present in approximately equimolar ratios. The charged and sealed pressure vessel is heated under autogenous pressure with mechanical shaking for 12 hours at 200° C. After cooling and venting of the reaction vessel to remove volatile products, there remains in the vessel 35 parts of a mixture of solid and oily material. Separation of the components of the reaction mixture is accomplished by crystallization from a concentrated methanol solution. After several crystallizations there is obtained 2.1 parts of a white crystalline solid, melting at 54–55° C. The compound is 2,3,5,6-tetramethyl-7,8-bis(trifluoromethyl)bicyclo[2.2.2]octa-2,5,7-triene. The identity of the compound is confirmed by nuclear magnetic resonance, ultraviolet and infrared spectra and by elemental analysis. The ultraviolet absorption spectrum consists of a weak band at 2870 A. ($\epsilon=70$), fitting the unconjugated structure obtainable by a Diels-Alder type of addition to durene.

Analysis.—Calc'd for $C_{14}H_{14}F_6$: C, 56.76; H, 4.76; F, 38.48; M.W., 296. Found: C, 56.75; H, 5.09; F, 38.64; M.W., 296.

B. A pressure vessel (capacity, 400 parts of water) is charged as described in part A with 32.4 parts of hexafluoro-2-butyne and 20.1 parts of durene. The mixture is heated under autogenous pressure at 200° C. for 10 hours. There is obtained 15 parts (34% yield) of 2,3,5,6-tetramethyl - 7,8-bis(trifluoromethyl)bicyclo[2.2.2]octa-2,5,7-triene.

The compound obtained by the process of Example I has the following structural formula:

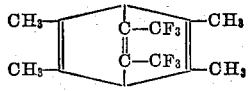

The compound is soluble in acetone, ethanol, ethyl acetate, dimethyl formamide and similar oxygenated organic compounds. It can be distilled under reduced pressure.

By using the process of Example I, 1,4-dihydrotetrafluoro-2-butyne and durene are reacted to obtain 2,3,5,6-tetramethyl - 7,8 - bis(difluoromethyl)bicyclo[2.2.2]-octa-2,5,7-triene. Reaction of 1,4-dichlorotetrafluoro-2-butyne with durene yields 2,3,5,6-tetramethyl-7,8-bis-(chlorodifluoromethyl)bicyclo[2.2.2]octa-2,5,7-triene.

*Example II*

A mixture of 6.7 parts of durene and 15.2 parts of 1,12-dihydroeicosafluoro-6-dodecyne $$[HCF_2(CF_2)_4—C≡C—(CF_2)_4—CF_2H]$$

is reacted at 200° C. for 15 hours in a sealed glass tube under a nitrogen atmosphere. The reaction mixture which is homogeneous when hot separates into three liquid phases on cooling. The mixture is dissolved in petroleum ether, chilled to 0° C. and filtered to separate the crystals which form. The filtrate is heated on a steam bath to remove petroleum ether and the residue is then heated at 70° C. under 2 mm. pressure to remove volatile products. There remains 10.8 parts of 2,3,5,6-tetramethyl - 7,8 - bis(omega - hydroperfluoroamyl)-bicyclo[2.2.2]octa-2,5,7-triene, a pale orange, thick oil which has the following structure:

The compound boils at 98–99° C./0.2 mm. Its structure is confirmed by infrared, nuclear magnetic resonance and ultraviolet spectra and by elementary analysis.

*Analysis.*—Calc'd. for $C_{22}H_{16}F_{20}$: C, 40.01; H, 2.44; F, 57.55. Found: C, 40.08; H, 2.33; F, 57.47.

*Example III*

Using a reaction vessel and procedure as described in Example I, a mixture of 25.6 parts of naphthalene and 24 parts of hexafluoro-2-butyne is heated under autogenous pressure for 1.5 hours at 225° C. There is obtained 41 parts of mixed liquid and solid product which is distilled under reduced pressure through an efficient fractionating column to yield 16.1 parts of 2,3-bis(trifluoromethyl) - 1,4 - dihydro - 1,4 - ethenonaphthalene; B.P. 96° C./mm., $n_D^{26}$, 1.4597. The compound is initially a colorless oil which solidifies on standing at about 25° C. to crystals, M.P. 42–43° C. The identity of the product is confirmed by nuclear magnetic resonance, ultraviolet and infrared spectra and by elemental analysis. The compound has the following structure:

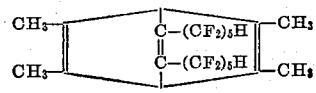

*Analysis.*—Calc'd. for $C_{14}H_8F_6$: C, 57.94; H, 2.78; F, 39.28. Found: C, 58.38; H, 3.06; F, 39.15.

In a manner similar to the process described in Example III, a mixture of 31.6 parts of 2-methoxynaphthalene and 32 parts of hexafluoro-2-butyne is reacted at 200° C. for 7 hours at a pressure of 1400 lb./sq. in. There is obtained 2-methoxy-9,10-bis(trifluoromethyl)-1,4-dihydro-1,4-ethenonaphthalene, a compound which has the following structure:

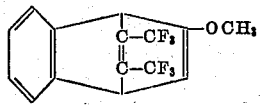

By employing the process of Example III, 2,3-bis(chlorodifluoromethyl) -1,4- dihydro -1,4- ethenonaphthalene is obtained from 1,4-dichlorotetrafluoro-2-butyne and naphthalene.

*Example IV*

A. Using a reaction vessel and procedure as described in Example I, a mixture of 17.8 parts of anthracene and 24 parts of hexafluoro-2-butyne is heated for 2 hours at 200° C. under autogenous pressure. There is obtained 24.2 parts of 11,12-bis(trifluoromethyl)-9,10-dihydro-9,10-ethenoanthracene, a solid white product which, after crystallization from aqueous ethanol and drying, melts at 110° C. The structure of the compound is confirmed by ultraviolet, infrared and nuclear magnetic resonance spectra and by elementary analysis. The structure is as follows:

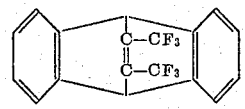

*Analysis.*—Calc'd. for $C_{18}H_{10}F_6$: C, 63.53; H, 2.96; F, 33.50. Found: C, 63.88; H, 3.09; F, 33.61.

B. A mixture of 3.4 parts of anthracene and 10.09 parts of 1,12-dihydroeicosafluoro-6-dodecyne is reacted at 200° C. for 1.5 hours in a glass pressure vessel as described in part A. The crude reaction product is heated at 100° C. and 0.3 mm. pressure to remove volatile products. There remains as a viscous residue 11,12-bis(omega-hydroperfluoroamyl) - 9,10 - dihydro - 9,10 - ethenoanthracene which has the following structure:

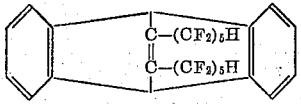

C. A pressure vessel (capacity, 100 parts of water) is charged with 8.9 parts of anthracene and 14.8 parts of 1,6-dichloroperfluoro-3-hexyne as described in Example I. The mixture is heated with agitation for 10 hours at 200° C. under autogenous pressure. There is obtained 19 parts of a solid product which is crystallized from 95% ethanol to obtain 15.2 parts of 11,12-bis(2-chlorotetrafluoroethyl) - 9,10 - dihydro - 9,10 - ethenoanthracene, a white crystalline solid, M.P. 72–74° C. The identity of the compound is confirmed by nuclear magnetic resonance and ultraviolet spectra and by elemental analysis.

*Analysis.*—Calc'd. for $C_{20}H_{10}Cl_2F_8$: C, 50.76; H, 2.13; Cl, 14.99; F, 32.12. Found: C, 50.80; H, 2.58; Cl, 14.90; F, 32.16.

In like manner, 11-trifluoromethyl-12-perfluoroethyl-9,10-dihydro-9,10-ethenoanthracene is obtained from perfluororo-2-pentyne and anthracene.

*Example V*

A mixture of 0.8 part of hexafluoro-2-butyne, 1.55 parts of 2,3,6,7-tetrakis(trifluoromethyl)naphthalene and about 3.7 parts of perfluorodimethylcyclohexane is heated at 225° C. for 16.5 hours at 800 atmospheres external pressure in a sealed platinum tube. There is obtained 2.56 parts of a liquid reaction mixture which is chilled in a solid carbon dioxide-acetone bath. The solid which forms is separated by filtration and yields 1.73 parts of crude 2,3,6,7,9,10-hexakis(trifluoromethyl)-1,4-dihydro-1,4-ethenonaphthalene, whose structure is shown in example VI below. The compound which is purified by repeated crystallizations from methanol, is a white solid, M.P. 122–123° C.

*Example VI*

A mixture of 1.32 parts of benzene and 8.4 parts of hexafluoro-2-butyne is heated under nitrogen at 225° C. and 1000 atmospheres pressure for 15.5 hours. There is obtained a mixture of 1.95 parts of yellow liquid and 5.33 parts of a white solid which melts at 109–114° C. The solid is purified by sublimation and crystallization from carbon tetrachloride and from methanol. The product, which is 2,3,6,7,9,10-hexakis(trifluoromethyl)-4-dihydro-1,4-ethenonaphthalene, melts at 122.5–123.5° C. and is identical with the product obtained in Example V. Its identity is confirmed by nuclear magnetic resonance, ultraviolet and infrared spectra and by elemental analysis. The compound has the following structure:

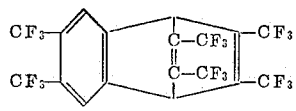

*Analysis.*—Calc'd for $C_{18}H_4F_{18}$: C, 38.45; H, 0.72; F, 60.83. Found: C, 38.62; H, 1.18; F, 60.46.

B. Using a reaction vessel and procedure as described in Example I, a mixture of 160 parts of benzene and 81 parts of hexafluororo-2-butyne is heated at 250° C. for 12 hours under autogeneous pressure. There is obtained 244 parts of a liquid reaction product which is distilled through an efficient fractionating column until all products boiling up to about 125° C./50 mm. are removed. The residue in the distillation pot is purified by sublimation and by repeated crystallization from methanol to obtain 1.9 parts of 2,3,6,7,9,10-hexakis(trifluoromethyl)-1,4-dihydro-1,4-ethenonaphthalene.

In the above reaction (Example VI, parts A and B), there is obtained as an intermediate product 2,3-bis-(trifluoromethyl)bicyclo[2.2.2]octa-2,5,7-triene, a compound which undergoes further reaction under the conditions employed to yield the following products which are isolated [in addition to the above hexakis(trifluoromethyl)-ethenonaphthalen] in the fractional distillation step:

(*a.*) 1,1,1,4,4,4-hexafluoro-2-butene—B.P. 34–36° C.
(*b.*) 1,2,4,5-tetrakis(trifluoromethyl)benzene—M.P. 72–74° C.
(*c.*) 1,2,4-tris(trifluoromethyl)benzene—$n_D^{25}$, 1.3681

*Analysis.*—Calc'd for $C_9H_3F_9$: C, 38.32; H, 1.07; F, 60.62. Found: C, 38.76; H, 1.31; F, 60.56.

(*d.*) 1,2-bis(trifluoromethyl)benzene—$n_D^{25}$, 1.3917
(*e.*) A tetrakis(trifluoromethyl)naphthalene—B.P. ca. 125° C./50 mm.; M.P. 102–103° C.

*Analysis.*—Calc'd for $C_{14}H_4F_{12}$: C, 42.02; H, 1.01; F, 56.97; M.W., 400. Found: C, 42.14; H, 1.15; F, 56.96; M.W., 372.

There is also obtained from the distillation residue 2,3,6,7-tetrakis(trifluoromethyl)naphthalene, a white solid which melts at 173–174° C. (sealed tube). This compound is useful as a reaction intermediate to obtain the hexakis(trifluoromethyl)ethenonaphthalene described in Example V.

By using the process described in Example VI, o-xylene is reacted with hexafluoro-2-butyne at 250° C. for 13 hours to obtain 2,3-dimethyl-5,6-bis(trifluoromethyl)bicycle[2.2.2]octa-2,5,7-triene, a compound which reacts further to yield 1,2-bis(trifluoromethyl)benzene and 2-butyne. In like manner, 1,2,4-trimethylbenzene is reacted with hexafluoro-2-butyne at 220° C. for 13 hours to yield 2,3,5-trimethyl-7,8-bis(trifluoromethyl)bicyclo-[2.2.2]octa-2,5,7-triene. This compound at 220–250° C. undergoes further reaction which results in the formation of 1,2-dimethyl-4,5-bis(trifluoromethyl)benzene and 3,4-bis(trifluoromethyl)toluene. Benzotrifluoride is reacted with hexafluoro-2-butyne at 250° C. for 10 hours to yield 2,3,5-tris(trifluoromethyl)bicyclo[2.2.2]octa-2,5,7-triene, a compound which undergoes further reaction to form 1,2,4-tris(trifluoromethyl)benzene.

The compounds of the invention, as shown above, are useful as reactants to prepare stable fluoroalkyl-substituted aromatic compounds which are useful as stable fluids. To illustrate further, the compound obtained from durene and hexafluoro-2-butyne, as described in Example I, i.e., 2,3,5,6-tetramethyl-7,8-bis(trifluoromethyl)-bicyclo[2.2.2]octa-2,5,7-triene is used to prepare 1,2-dimethyl-4,5-bis(trifluoromethyl)benzene as follows:

A sealed pressure vessal (capacity, 80 parts of water) which contains 10 parts of 2,3,5,6-tetramethyl-7,8-bis(trifluoromethyl)bicyclo[2.2.2]octa-2,5,7-triene is heated under autogeneous pressure at 250° C. for 10 hours. There is obtained 9 parts of oily reaction product which is fractionally distilled under reduced pressure to yield about 3.0 parts of 1,2-dimethyl-4,5-bis(trifluoromethyl)-benzene, boiling at 84–90° C./20 mm.

The compounds of the invention are generically useful as plasticizers for shaped objects prepared from polymers, for example, for films or sheets of polystyrene. The usefulness of the compounds in this field is illustrated in the following paragraph.

Films of a commercial polystyrene are cast from solutions of the polymer in benzene which contain small quantities of the compounds of the invention obtained as described in Examples I, III, and IV. The films, after drying in air, contain about 17% by weight of the bicyclo[2.2.2]octa-2,5,7-triene. A control film, i.e., a film containing no plasticizer, is prepared for comparative testing. The films are flexed in one direction and then in the reverse direction repeatedly until breakage occurs. The number of times the films can be flexed without breaking is summarized as follows:

| Additive in Film | Average number of flexes to breakpoint |
|---|---|
| None—control | 2 |
| 2,3,5,6-Tetramethyl-7,8-bis(trifluoromethyl)bicyclo-[2.2.2]octa-2,5,7-triene | 91 |
| 2,3-bis(trifluoromethyl)-1,4-dihydro-1,4-ethenonaphthalene | 83 |
| 11,12-bis(trifluoromethyl)-9,10-dihydro-9,10-ethenonanthracene | 53 |

The films containing the compounds of the invention can thus be flexed from 25 to 45 times as often as the control film before breaking.

What is claimed:

1. A compound represented by the following structural formula:

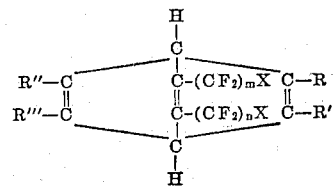

wherein R and R' are selected from the group consisting of hydrogen, hydrocarbon, halohydrocarbon, and hydrocarbyloxy of up to 16 carbons and free of aliphatic unsaturation and joined together represent a divalent 1,3-dienylene group which forms an aromatic ring with doubly bonded nuclear carbons; R" and R'" are selected from the group consisting of hydrogen, hydrocarbon groups of up to 16 carbons free of aliphatic unsaturation and joined together represent a divalent 1,3-dienylene group which forms an aromatic ring with doubly bonded nuclear carbons; X is selected from the group consisting of hydrogen, fluoride and chlorine and the subscripts $m$ and $n$ are positive integers, the sum of which is at most 22.

2. 2,3 - bis(trifluoromethyl)bicyclo[2.2.2]octa - 2,5,7-triene.

3. 2,3,5,6 - tetramethyl-7,8-bis(trifluoromethyl) - bicyclo[2.2.2]octa-2,5,7-triene.

4. 2,3 - bis(trifluoromethyl) - 1,4-dihydro-1,4-ethenonaphthalene.

5. 11,12 - bis(trifluoromethyl) - 9,10-dihydro - 9,10-ethenoanthracene.

6. 2,3,6,7,9,10 - hexakis(trifluoromethyl) - 1,4-dhiydro-1,4-ethenonaphthalene.

7. A 2,3 - bis(perfluoroalkyl)bicyclo[2.2.2]octa-2,5,7-triene.

8. A 2,3 - bis(perfluoroalkyl)-1,4-dihydro-1,4 - ethenonaphthalene.

9. An 11,12 - bis(perfluoroalkyl) - 9,10-dihydro-9,10-ethenoanthracene.

10. A 2,3-bis(omega-hydroperfluoroalkyl)-1,4-dihydro-1,4-ethenonaphthalene.

11. A process for making unsaturated, cyclic, organic compounds which comprises reacting hexafluoro-2-butyne with benzene.

12. A process for preparing unsaturated, cyclic, organic compounds which comprises reacting durene with hexafluoro-2-butyne.

13. A process for making unsaturated, cyclic, organic compounds which comprises reacting anthracene with hexafluoro-2-butyne.

14. A process for preparing unsaturated, cyclic, organic compounds which comprises reacting anthracene with 1,12-dihydroeicosafluoro-6-dodecyne.

15. 11,12-bis(2-chlorotetrafluoroethyl) - 9,10-dihydro-9,10-ethanoanthracene.

16. A method of making unsaturated, polycyclic, organic compounds which comprises reacting a compound of the formula $X(CF_2)_m-C\equiv C-(CF_2)_nX$ wherein X is selected from the group consisting of hydrogen, chlorine, and fluorine and the subscripts $m$ and $n$ are positive integers whose sum is at most 22 with an organic compound containing an aromatic ring in which the nuclear carbons in the 1- and 4-positions are each bonded to hydrogen; the nuclear carbons in the 2- and 3-positions are each bonded to a member of the group consisting of hydrogen, hydrocarbon, halohydrocarbon and hydrocarbyloxy of up to 16 carbons and free of aliphatic unsaturation and joined together represent a divalent 1,3-dienylene group which forms an aromatic ring with doubly bonded nuclear carbons; and the nuclear carbons in the 5- and 6-positions are each bonded to a member of the group consisting of hydrogen, hydrocarbon groups of up to 16 carbons free of aliphatic unsaturation and joined together represent a divalent 1,3-dienylene group which forms an aromatic ring with doubly bonded nuclear carbons.

17. The process of claim 16 wherein the compound containing the acetylenic linkage is a bis(perfluoroalkyl)-acetylene.

18. The process according to claim 17 wherein the compound containing the acetylenic linkage is a bis-(omega-hydroperfluoroalkyl) acetylene.

19. The process of claim 16 carried out at a temperature between about 100 and 500° C. and preferably at a temperature between about 150 and 350° C.

No references cited.

UNITED STATES PATENT OFFICE
CERTIFICATION OF CORRECTION

Patent No. 2,977,394　　　　　　　　　　　　March 28, 1961

Carl George Krespan et al.

It is hereby certified that error appears in the above numbered patent requiring correction and that the said Letters Patent should read as corrected below.

Column 2, line 54, for "fluoromethyl" read -- trifluoromethyl --; column 4, line 28, strike out "sulfur"; column 7, line 8, for "proces" read -- process --; column 8, lines 20 to 25, the left-hand portion of the formula should appear as shown below instead of as in the patent:

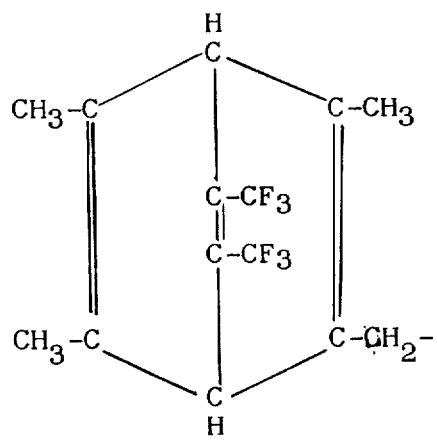

column 11, line 16, for "(trifluoromethyl)-" read -- (trifluoromethyl)-1,--; column 12, line 23, for "84-90° C./20 mm." read -- 84-91° C./20 mm. --; column 13, line 1, for "fluoride" read -- fluorine --.

Signed and sealed this 19th day of September 1961.

(SEAL)
Attest:

ERNEST W. SWIDER　　　　　　　　　　　　DAVID L. LADD
Attesting Officer　　　　　　　　　　　　Commissioner of Patents